Feb. 20, 1962 G. K. HAUSE 3,021,726
TRANSMISSION
Filed April 24, 1957 7 Sheets-Sheet 1

INVENTOR.
Gilbert K. Hause
BY T. R. Chisholm
ATTORNEY

INVENTOR.
Gilbert K. Hause
BY
ATTORNEY

INVENTOR.
Gilbert K. Hause
BY
T. L. Chisholm
ATTORNEY

United States Patent Office 3,021,726
Patented Feb. 20, 1962

3,021,726
TRANSMISSION
Gilbert K. Hause, Franklin, Mich., assignor to General
Motors Corporation, Detroit, Mich., a corporation of
Delaware
Filed Apr. 24, 1957, Ser. No. 654,771
22 Claims. (Cl. 74—677)

This invention relates to transmissions and final drives for automobiles and includes features disclosed in my copending application Serial Number 515,656, filed June 15, 1955, now abandoned.

Car designers are now trying to make cars low while providing adequate ground clearance. When this was attempted with the types and arrangements of transmission, propeller shaft and differential housing formerly available, it required the transmission and propeller shaft to be placed above the floor level of the car. Therefore, a so-called tunnel was used to separate the drive line from the interior of the car. The tunnel is undesirable, and efforts have been made to eliminate it or reduce its height. One such effort involves a unitary assembly of the transmission housing and differential housing which is placed in the space under the rear seat and tilted about the axis of the rear wheels to lower the front end of the transmission. This lowers the propeller shaft.

It is among the objects of the invention to provide an advantageous combination of transmission and final drive assembly which is especially suited to the low car design outlined above, and to provide an improved and novel form of transmission which makes this combination possible.

More specifically, objects of the invention are to provide an improved and compact form of transmission which facilitates increasing the length of the propeller shaft for a given car design and thus improving the angle of the propeller shaft with respect to engine and transmission, and to provide a transmission which has low ground clearance while providing high torque and a high degree of torque multiplication.

It is also an object to provide an improved construction and arrangement of hydrodynamic torque transmitter which makes possible the use of an overrunning clutch between the input and output shafts and one which provides improved flow characteristics of working liquid through the torque transmitter, and especially through a reaction member. The invention is particularly adapted to torque converters which multiply torque, but it is also applicable to hydrodynamic torque transmitters generally.

These and other objects and advantages of the invention will appear in the following description and accompanying drawings.

In the drawings:
FIG. 7A is a section through the gearing, behind the front pump and in front of the torque converter,
FIG. 7D is an enlarged detail view of a portion of FIG. 7B.

*General arrangement*

Figure 1:
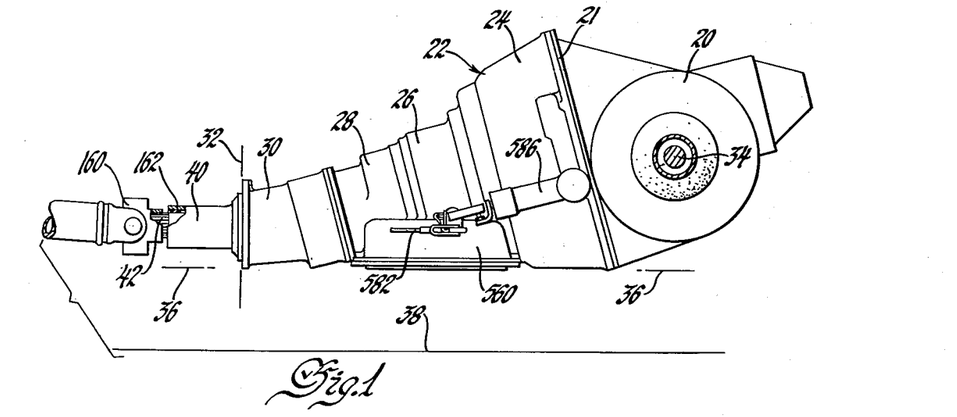
FIG. 1 is a side elevation of a transmission and differential assembly embodying one form of the invention, showing the relationship of this assembly to the ground when the transmission is placed in a car.

Referring to FIG. 1 the transmission and differential assembly includes a differential housing 20 having a generally circular front wall 21 to which is bolted a transmission housing designated as a whole by 22 which includes a torque transmitter housing 24, a gear housing 26, a clutch housing 28 and may include a universal joint housing 30, all secured together in any suitable manner from rear to front in the order named.

The transmission housing 22 is of tapering form and can in general be contained within a truncated cone whose larger base is the front wall 21 of the differential housing 20, and whose smaller base is a circle in a plane whose trace in FIG. 1 is the line 32 at the front end of the universal joint housing 30. The entire assembly can be rotated about the axis of the drive axles 34 and may be placed in the car so that the lowermost geometrical element of the truncated cone, which element is represented by the broken line 36, is disposed substantially parallel to the level surface of the ground 38. This arrangement makes it possible for the largest part of the transmission housing to be placed in the space under the rear seat of a car without taking up any room above the normal lower surface of the car body and permits the customary propeller shaft of the car to enter the transmission housing at an angle to place the propeller shaft as low as possible with respect to the car body and thus reduce the height of, or eliminate, any tunnel in the car floor which may be necessary to accommodate the propeller shaft or its housing. To this end the universal joint housing includes a bearing retainer 40 for the drive shaft disposed at an angle to the axis of the transmission to receive a propeller shaft which is substantially parallel to the ground.

Figure 2:
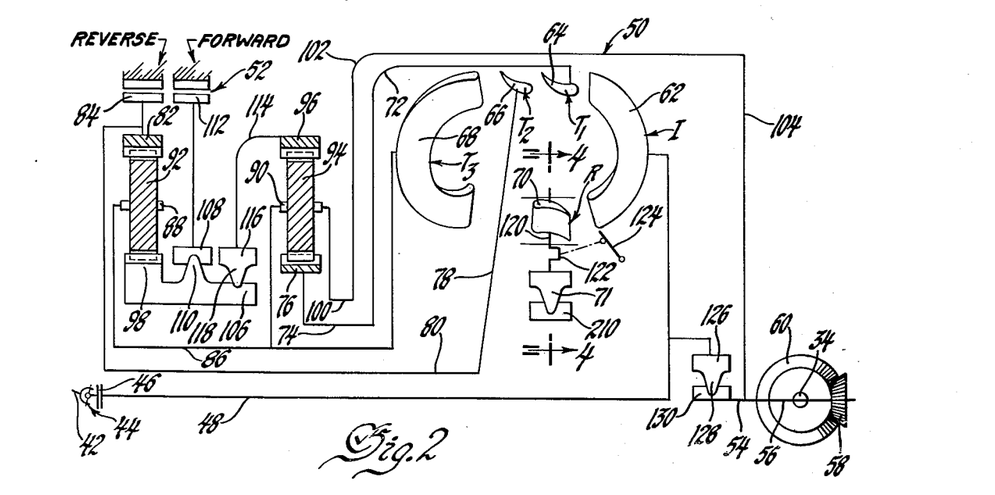
FIG. 2 is a schematic upper half of a longitudinal section which is symmetrical about the axis of rotation of a transmission and differential assembly embodying one form of the invention. In this and succeeding figures the transmission is shown with its axis parallel to the ground, for convenience in reading the drawings, this being a different position than shown in FIG. 1.
Figure 7:
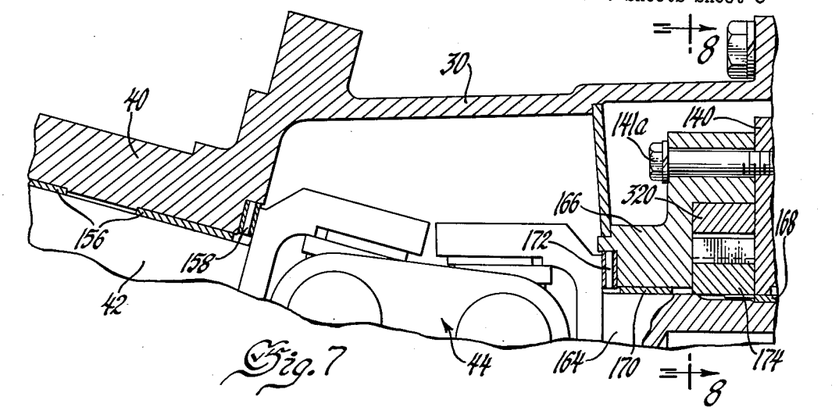
FIG. 7 is a section through the front end of the assembly, including the universal joint and front pump.
Figure 7B:
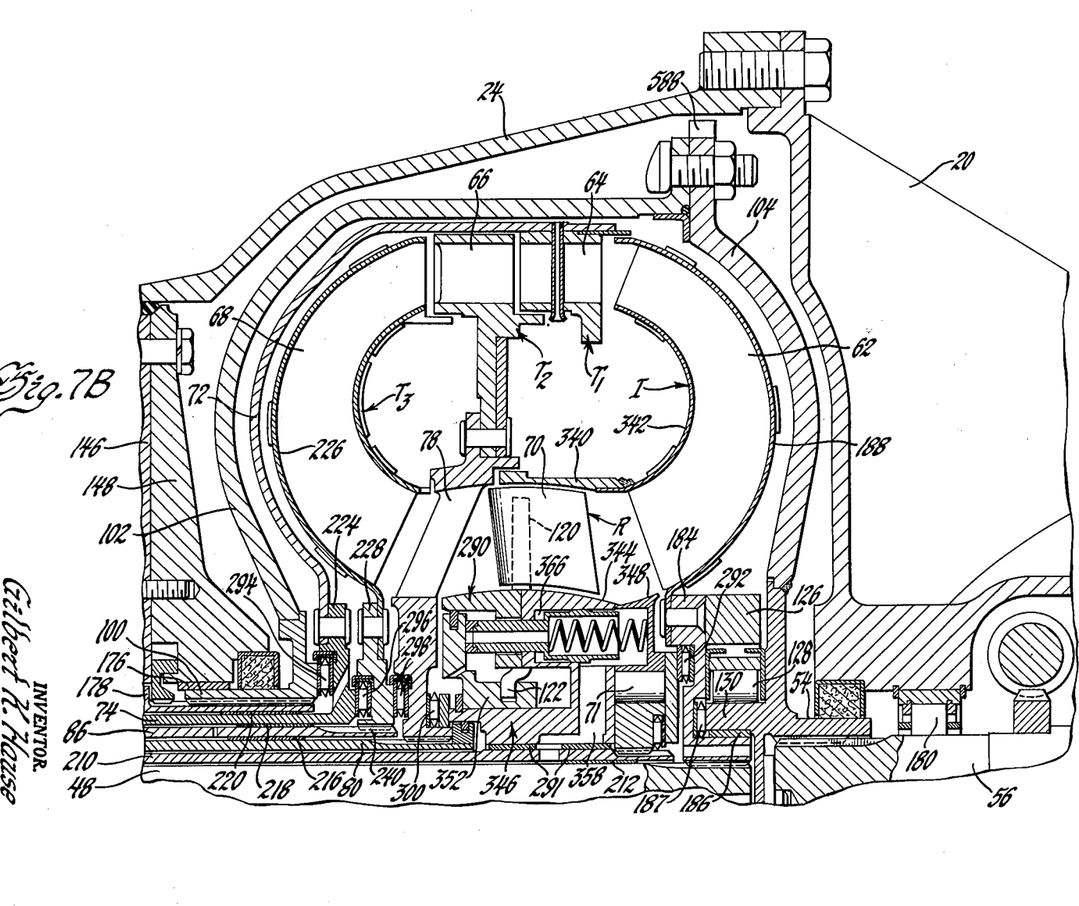
FIG. 7B is a section through the torque converter, in front of the differential.
Figure 7C:
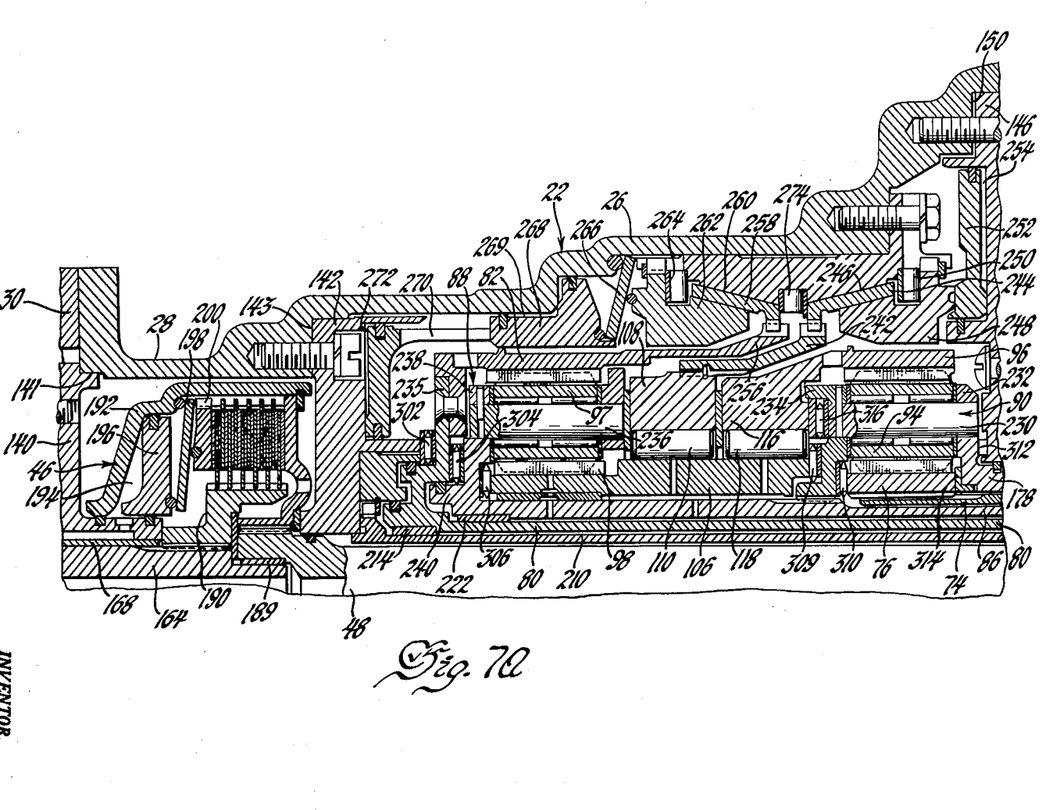
FIG. 7C is a section through the differential.

The transmission housing encloses a transmission schematically shown in FIG. 2 and structurally illustrated in FIGS. 7, 7A and 7B.

Referring to FIG. 2 a power input shaft 42, which may be connected to, or a part of, a customary propeller shaft driven by the engine of the car, is connected to a universal joint 44 which through a torque establishing device 46 can selectively be connected to or disconnected from a transmission input shaft 48 which drives a hydrodynamic torque transmitter, preferably a torque converter 50, which drives a planetary forward and reverse reduction gearing 52 physically disposed between the torque converter and the device 46. The gearing drives a transmission output shaft 54 connected to the input shaft 56 of the differential and driving the input pinion gear 58 which meshes with the differential ring gear 60 which drives the axles 34 of the rear wheels in any suitable known manner.

The invention includes novel features in the construction and arrangement of the torque converter, in the construction and arrangement of the reduction gearing separately and in combination with a torque converter, and in the arrangement of the torque converter and its output shaft with reference to the differential.

The torque converter includes a pump or impeller I of generally known form represented diagrammatically in FIG. 2 by a single blade 62 which may be rotated by the input shaft 48.

A first turbine $T_1$ is represented in FIG. 2 by a single blade 64 which receives liquid from the pump and discharges it to a second turbine $T_2$ represented by blade 66, which in turn discharges the liquid to a third turbine represented by blade 68 which returns the liquid to the impeller I through a stator or reaction member R represented by blade 70 and controlled for forward rotation only by a ratchet device 71.

The first turbine $T_1$ is connected by a drum 72 and shaft 74 to drive the input sun gear 76 of a first or rear planetary gear set. The second turbine $T_2$ is connected by a spider 78 and shaft 80 to drive the input ring gear 82 of a second or front planetary gear set. The ring gear can be held fast by a reverse torque establishing device 84 to effect reverse drive, as will be explained. The third turbine $T_3$ is connected by a shaft 86 to drive the carriers 88 and 90, respectively, of the front and rear planetary gear sets, which carriers support front planetary pinions 92 meshing with the front input ring gear 82 and rear planetary pinions 94 which mesh with the rear input sun gear 76. A rear reaction ring gear 96 meshing with planet pinions 94 completes the rear planetary gear set, and a reaction sun gear 98 meshing with the planet pinions 92 completes the front planetary gear set.

The $T_3$ shaft 86 is the principal output shaft of the torque converter, and through carrier 90 it is connected to a transmission output member 100 physically located between the torque converter and the gearing. A drum 102 and flange 104 collectively form a casing surrounding the torque converter which casing connects the output member 100 to the transmission output shaft 54.

Heretofore the various definitons of the terms clutch and brake have caused confusion. Some attempts to define the terms have been based on use or function regardless of structure while others have been based on type of structure or arrangement, regardless of use or function. This has sometimes led to the definitions of clutch and brake being mutually exclusive where they should not be, and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch as described by reference to structure where the point in interest is the function of the device regardless of its structure. To avoid this confusion and indefiniteness the term torque establishing device is used herein generically to mean any device which can be engaged to prevent rotation between two members which otherwise are relatively rotatable. If both members are rotatable absolutely the torque establishing device when engaged forces them to rotate at the same speed so that one member drives the other. In this case the device is sometimes called a clutch. If one of the members is fixed then engagement of the torque establishing device holds the other member fast, in which case the device is sometimes called a brake or lock. Where the torque establishing device prevents relative rotation between two members in one sense but permits relative rotation in the opposite sense then the device is sometimes called a freewheeler. If both members are rotatable absolutely the freewheeler is a one-way drive clutch. If one of the members cannot rotate, the freewheeler becomes a one-way brake.

The sun gear 98 is formed integral with a freewheeler member 106 the upper half of which as represented in FIG. 2 can turn forward, that is out of the plane of the paper toward the eye of the observer with respect to a second freewheeler member 108. The freewheeler is completed, as symbolically represented in FIG. 2, by a ratchet member 110 which is fixed to the member 106 and engages the member 108 if the member 106 tends to rotate backward. The member 108 is rotationally fixed to a forward torque establishing device 112 which can be held to prevent rotation of the freewheeler element 108. When this occurs the sun gear 98 is positively held against reverse rotation but may rotate forward with respect to the ratchet device 106—110—108. The rear ring gear 96 is rotationally fixed through a drum 114 to a member 116 of a second ratchet device having a ratchet element 118 which engages the member 106 whenever the member 116 tends to rotate backward but permits the ratchet member 116 to rotate forward out of the plane of the paper toward the eye of the observer with respect to the ratchet member 106.

The stator blades 70 are each mounted on a spindle 120 having a crank 122 suitably connected to the throttle 124 of the engine which drives the car so that the blades can be positioned to vary with the torque demand on the engine the range of torque multiplication effected by the torque converter.

In order to prevent the car running faster than the engine and thus in order to provide engine braking, I place a freewheeler between the input shaft 48 and the output shaft 54. This is represented schematically in FIG. 2 by the member 126 secured to the drive shaft 48 and fixed to a ratchet member 128 which engages member 130 secured to the shaft 54. Whenever the output shaft tends to rotate faster than the input shaft 48, the freewheeler 130—128—126 locks to cause the car to drive the engine.

*Operation of general arrangement*

The arrangement described operates as follows:

Assume that the input shaft 42 is driven by the idling engine of an automobile, that the neutral device 46 is engaged and that the car is at rest. The impeller I is rotating slowly.

For forward drive the torque establishing device 112 is set and the reverse torque establishing device 84 is released. When the engine is speeded up the impeller I circulates liquid thru the turbines and impresses torque upon them. Initially the stationary axles 34 hold the carriers 88 and 90 and the turbine $T_3$ stationary. $T_1$ drives the rear input sun gear 76 forward. Because the rear carrier 90 is momentarily held stationary the rear pinions 94 attempt to drive the rear reaction ring gear 96 backward. This is prevented by the torque establishing device 112 and the two freewheelers 106—118—116 and 106—110—118. The rear or inner race 116 locks the ratchet element to the center race 106 which locks the ratchet element 110 to the front or outer race 108, which is held. Consequently the ring gear 96 acts as a reaction gear and the carrier 90 is driven slowly forward, multiplying the torque impressed on turbine $T_1$ by the ratio or mechanical advantage of the rear planetary gear set. This motion of the carrier 90 drives the car and also positively drives forward the front carrier 88 and the third turbine $T_3$ regardless of hydraulic condition in the torque converter. $T_1$ while exerting its positive drive necessarily runs faster than the output member 100 and turbine $T_3$ as determined by the ratio of the rear planetary gear set.

In addition, oil flowing from $T_1$ to $T_2$ exerts torque on $T_2$ which through shaft 80 drives the front ring gear 82 forward, tending to rotate the front pinions 92 forward, and when the ring gear 82 rotates fast enough, tending to rotate the front reaction sun gear 98 backward. This is prevented by the front one-way brake 106—110—108 which has previously been locked by the rear reaction ring gear 96. Consequently, the front ring gear 82 runs at a speed faster than the speed of the carriers as determined by the ratio of the front planetary unit and adds its torque to the output member 100.

On starting the car, and below some definite speed depending upon the design of the blades of the torque converter, the third turbine $T_3$ may not exert any positive or forward torque derived from the circulating liquid, but as previously stated it is positively driven by the carriers. However, at some relative speed of input shaft to output shaft positive hydraulic torque is impressed on $T_3$ and its possible speed due to hydraulic action gradually increases and tends to exceed the actual speed of the carriers driven by the other turbines. At this point $T_3$ assists in driving the car by torque exerted on the main drive line composed of shaft 86, carrier 90, output member 100, shell 102, flange 104, output shaft 54 and differential shaft 56. As the speed of the car increases from standstill two things happen successively. First, the torque delivered to the output member 100 by $T_1$ through the rear planetary unit drops to a vanishing point as $T_1$ reaches its terminal speed. When the speed of $T_1$ divided by the torque multiplying ratio of the rear planetary unit becomes less than the speed of $T_2$ divided by the torque multiplying ratio of the front planetary unit the second turbine $T_2$ is driving the carriers and the output member 100 faster than $T_1$ can drive them. At this point the carriers 88 and 90, through the planet gears 94 rotate the ring gear 96 forward and the rear freewheeler 106—118—116 breaks away. $T_1$ idles in the oil stream neither giving up nor absorbing any appreciable torque. $T_2$ is now driving the car assisted by $T_3$. Second, as the speed of the car increases further $T_2$ reaches its terminal speed and can no longer drive the carriers through the front planetary gear set as fast as $T_3$ can drive them. At this point the front planetary gears 92 drive the sun gear 98 forward, the front freewheeler 106—110—118 breaks away, and $T_2$ idles in the stream of oil. Thereafter as the speed of the car increases $T_3$ continues to drive the car alone, either multiplying the torque of the engine or operating in coupling at substantially one-to-one drive, as is known. Conversely, as the speed of the car decreases the point is reached where the carriers tend to rotate slower than the speed of $T_2$ divided by the torque multiplying ratio of the front planetary gear set. Now $T_2$ rotates the ring gear 82 fast enough to attempt to rotate the sun gear 98 backward. This sets the front freewheeler 106—110—118 so that $T_2$ picks up the drive and assists $T_3$ in driving the car. If the car slows down still more $T_1$ picks up the drive by rotating the sun gear 76 fast enough to try to rotate the ring gear 96 backward which sets up the rear freewheeler 106—118—116 so that $T_1$ picks up the drive and assists the other turbines in driving the car.

For reverse drive the forward torque establishing device 112 is released and reverse torque establishing device 84 is set to hold front ring gear 82 to act as a reaction gear. This holds $T_2$ stationary during all reverse drive. Now $T_1$ drives the rear input sun gear 76 forward which, because the carrier 90 is initially held by the stationary car, drives the ring gear 96 backward and through the rear one-way clutch 106—118—116 drives the sun gear 98 backwards. This is permitted indeed for although the front freewheeler 106—110—108 tends to lock, the member 108 can rotate freely backward because the torque establishing device 112 is released. Consequently, the rear freedwheeler 106—118—116 drives backward to rotate the carrier 88 backward because reaction ring gear 82 is held, thus driving the car backward. This also carries the turbine $T_3$ backward positively, but it is possible, depending on blade design, to impress reverse hydraulic torque on $T_3$ so that $T_3$ will assist in driving the car backward. This is because the stationary $T_2$ blades act as a guide wheel or reaction member directing oil from $T_1$ to the front sides of the $T_3$ blades, impressing reverse hydraulic torque on $T_3$.

The rear planetary gear set may have a gear ratio, for example of 2.55 so that when the ring gear 96 is held the sun gear 76 and the first turbine $T_1$ rotate 2.55 times as fast as the carrier 90 and the output member 100. The front planetary gear set may have a ratio of about 1.6 so that when the sun gear 98 is held the ring gear and second turbine $T_2$ rotate at 1.6 times the speed of the carriers. The third turbine $T_3$ and the output member 100 always rotate together. Thus, at any speed torque delivered to the output member 100 by any individual turbine equals the value of hydraulic torque on the turbine (taking into account its algebraic sign or sense of rotation) multiplied by the mechanical advantage of its connection to the output shaft. Therefore, at stall that is when the car is stationary but the impeller is rotating, although turbine $T_3$ may even exert a negative torque on the output member 100 the entire torque converter has a high positive torque ratio because this negative torque of $T_3$ is less than the high torque of the first turbine multiplied by the mechanical advantage of its connection to the output. At stall the torque ratio of the torque converter over all may be of the order of four to one. The torque ratio of the torque converter, as a whole, decreases until the speed of the $T_3$ turbine approaches the speed of the impeller I when the torque ratio is substantially unity and the condition known as coupling occurs.

As is known the range of torque multiplication effected by the torque converter increases with increase of the angle through which the blades 70 change the direction of oil between turbine $T_3$ and the impeller I. The connection of the crank 122 to the engine throttle 124 enables this angle to be progressively varied with change of throttle opening and hence in accordance with change of torque demand on the engine. When the torque demand is low, as indicated by a small throttle opening, the stator blades change the direction of the oil relatively little and so provide a relatively low range of torque multiplication. In this condition the blades are said to be at low angle or in low performance position. When the throttle is opened wider, the torque demand on the engine is greater and the vanes are moved toward high angle or high performance position in which they redirect oil from the turbine $T_3$ through a large angle to the impeller I. This provides an increased range of torque multiplication.

*Structural arrangement*

Figure 8:
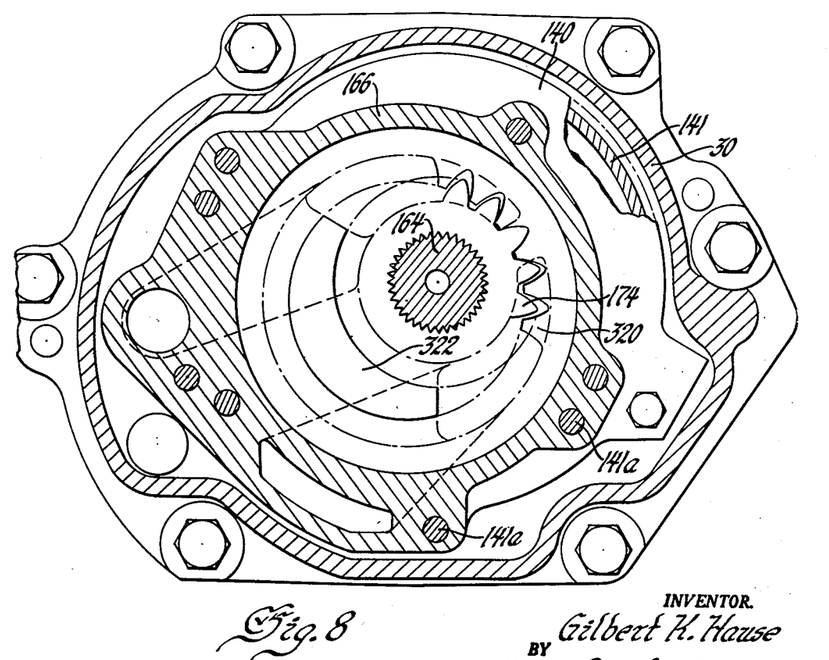
FIG. 8 is a section of an engine-driven or front pump on the line 8—8 of FIG. 7.

As shown in FIGS. 7, 7A, 7B, the transmission housing 22 may include a single tapered or approximately frusto-conical casting extending from the differential housing 20 to the universal joint housing 30, provided with shoulders to which may be fastened partitions dividing the transmission housing into the component housings which contain the torque converter, gearing, and neutral torque establishing device. The universal joint housing 30 has the smallest average diameter of the entire group of housings, and it is separated from the rest of the transmission housing by a flange 140 piloted by a boss 141 in the left end of the clutch housing 28 (FIG. 7A) and secured by bolts 141a (FIG. 8). A second flange 142 (FIG. 7A) bolted to a shoulder 143 in the main casting separates the clutch housing 28 from the gear housing 26, which in turn is separated from the torque converter housing by a third partition formed by a pair of flanges 146 and 148 bolted to a shoulder 150.

The tapering torque converter casing 24 has a mean or average diameter larger than the greatest diameter of the gear housing 26, whose mean diameter is larger than the mean diameter of the clutch housing 28 which in turn is larger than the mean diameter of the U-joint housing 30.

As shown in FIG. 7, at the front end of the transmission, the drive shaft 42 is supported in the bearing retainer 40 of the universal joint housing 30 by spaced radial bearings 156 and a roller thrust bearing 158. The front end of the shaft 42 is splined to a flange 160 by which the shaft 42 may be connected to any suitable propeller shaft, not shown. The flange 160 may be sealed to the housing 40 by any suitable seal 162. The rear end of the shaft 42 forms one end of the universal joint 44, the rear end of which is formed by a clutch input shaft 164 which latter is supported in the universal joint housing in the following way.

A pump casing 166 is dowelled and bolted to the flange 140, which latter includes a tubular portion which contains a bearing sleeve 168 in alignment with a second bearing sleeve 170 in a bore of the pump casing 166. The bearings 168 and 170 radially support the clutch input shaft 164 which is also supported against axial thrust by a thrust bearing 172 similar to the thrust bearing 158. The device thus far described supports the drive shaft 42, clutch input shaft 164, and universal joint 44 radially and axially against thrust in opposite directions. A pump gear 174 is splined to the clutch input shaft and forms part of the customary engine driven or front pump for supplying oil to the transmission, as will be explained.

Referring now to the output device of the transmission, as shown in FIG. 7B the transmission output member 100 is a sleeve formed with an integral radial flange welded to the output shell or casing 102 and splined to a sleeve 178 integral with or secured to a part of the rear planet carrier 90, as will be explained. The sleeve 100 is supported for rotation in a radial bearing 176 in the flange 148. The shell 102 extends around the torque converter and is bolted to the flange 104 which is integral with or secured to a central tubular shaft or socket 54 which is the previously mentioned final output shaft 54 of the transmission shown diagrammatically in FIG. 2. The shaft 54 is splined to the differential input shaft 56 which is supported in the differential housing by a front radial bearing 180 and rear radial and thrust bearings 182. Thus the entire output assembly of the transmission consisting of output member 100, shell 102, flange 104 and final output shaft 54 is positioned and supported for rotation in the casing 22 by the front bearing sleeve 176 and by the differential bearings 180, 182 through the differential input shaft 56. A portion of the shaft 54 extends to the left inside the flange 104 to form the previously mentioned inner race 130 of the free wheeler diagrammatically illustrated in FIG. 2. The outer race 126 of this free wheeler takes the form of the ring 126 shown in FIG. 7B which surrounds one-way rollers or sprags 128 which are the ratchet members 128 of FIG. 2. The outer race is fixed to a flange 184 which flange is supported for rotation on the inner side of the portion 130 of the shaft 54 by a radial bearing sleeve 186 and is splined to the right-hand end of the transmission input shaft 48. This supports the right-hand end of the shaft for rotation through the bearing sleeve 186 and transmission output shaft 54, differential input shaft 56 and its bearings 180 and 182. The flange 184 is supported against axial thrust by an anti-friction thrust bearing 187 running against the transmission output shaft 54. In the impeller, the customary outer shell 188 carrying impeller blades 62 is riveted to the flange 184 and thus is connected to input shaft 48, the left-hand or front end of which is supported for rotation on the radial bearing sleeve 189 to the end of the clutch input shaft 164 which has been described as supported for rotation from the casing of the transmission by the bearings 168 and 170 (FIG. 7A).

The neutral torque establishing device 46 in the clutch housing 28 includes an internal drum 190 splined to the input shaft 164 and carrying driving plates or disks which are interleaved with driven plates or disks carried by an external drum 192 splined to the front end of the transmission input shaft 48. The device may be engaged by fluid under pressure in an expandable chamber 194 enclosed in the external clutch drum 192 by a piston 196 which operates any suitable force multiplying device, such as a Belleville washer or spring 198 to urge a clamping plate 200 to the right to engage the driving and driven plates. The Belleville spring forms the return mechanism for the piston 196 when the pressure in chamber 194 is released.

The various shafts of the torque converter and gearing will be described in the order in which they are placed with reference to the axis of the transmission.

The transmission input shaft 48 is at the axis. Surrounding the input shaft and spaced from it to form a stator control passage is a stator support or ground sleeve 210 which extends forward through the gearing and is piloted at its front end in the partition 142 and fixed against rotation. The right or rear end of the sleeve 210 is supported by a bearing sleeve 212 on the transmission input shaft 48. The second turbine shaft 80 outside the ground sleeve 210 is radially supported for rotation at its front end by a bearing sleeve 214 on the front end of the ground sleeve 210, and at its rear end by a bearing sleeve 216 in the rear end of the third turbine shaft 86 which in turn is supported by a bearing sleeve 218 in the rear end of the first turbine shaft 74 which in turn is supported by bearing sleeve 220 in the output sleeve 178, referred to, which in turn is supported by the bearing 176. Thus the rear ends of all of the rotating turbine assemblies are supported radially from the transmission housing 22 by the flange 148 and the stack of bearings 176—220—218—216. The third turbine shaft 86 extends forward through both gear sets and is supported at its left end for rotation by a bearing sleeve 222 on the second turbine shaft 80.

The first turbine blades 64 are fixed to the first turbine shaft 74 by being attached to the shell 72 which is disposed just inside the shell 102 and at its center is riveted to a flange or hub 224 which may be integral with the shaft 74.

The second turbine $T_2$ is attached to its output shaft 80 through the spider 78 which at its center is splined to the rear end of the shaft 80.

The third turbine blades 68 are secured to an outer shell 226 which latter is riveted to a hub 228 splined to the right end of the $T_3$ shaft 86.

The $T_1$ shaft 74 extends forward from the torque converter to the rear planetary gear set and at its front end is splined to the input sun gear 76 which meshes with the planet pinions 94 journaled on the carrier 90. This carrier includes spindles 230 supported between a rear flange 232 formed integral with the output sleeve 178 and a front flange 234 which is splined to the $T_3$ shaft 86. The $T_2$ shaft 80 extends forward through both planetary gear sets, and is formed with an integral flange 235 at its front end which is riveted to the input ring gear 82. The front planet gears 92 are mounted on the front carrier 88 which includes spindles 236 supported in a front flange 238 splined to a flange 240 integral with the $T_3$ shaft 86. The front reaction sun gear 98 is formed integral with the freewheeler sleeve 106 and this supports side by side the two sets of rollers or sprags 110 and 118 which are the ratchet members 110 and 118 diagrammatically illustrated in FIG. 2. Thus the sleeve 106 forms the center race for the two freewheelers 106—110—108 and 106—118—116. Outside the ratchet members 118 is the rear or inner race 116 which is splined to the rear reaction ring gear 96. The forward freewheeler includes the forward or outer race 108, previously referred to, which is splined to drum 242 splined to a conical reaction drum 244 which corresponds to the device 112 in FIG. 2. The race 108 of the front freewheeler can be positively held against rotation by clamping the drum 244 between a stationary cone 246 secured to the transmission casing and a nonrotatable but slideable cone 248 which may be urged to the left, to overcome a return spring 250, by an annular piston 252 which can be urged forward by the pressure of oil supplied by any suitable means to an expandable chamber 254 formed in the flange 146.

The front input ring gear 82 is formed integral with a drum 256 splined to a conical reaction drum 258 (corresponding to the reverse torque establishing device 84 in FIG. 2) which may be held by clamping between a stationary cone 260 secured to the transmission casing and a non-rotatable but slideable cone 262 which may be urged to the right to overcome the return spring 264 by a force multiplying actuator such as a Belleville washer or spring 266 which can be urged to the right by a primary piston 268 movable by fluid pressure in a cylinder 269 and assisted by a secondary piston 270 actuated by fluid pressure in an expandable chamber 272 formed in the flange 142. A return spring 274 between the cones 244 and 258 assures disengagement of either cone when its energizing actuator is released.

The reaction device, guide wheel or stator R is constructed as shown in FIG. 7B, described at further length below. The stator includes an annular support 290 which can turn on bearing sleeves 291 adjacent the rear end of the ground sleeve 210.

The transmission includes suitable thrust bearings to take up the various complex axial forces that occur in the operation of the device. The rearward thrust of the impeller is taken by the flange 104 through the thrust bearing 187, referred to, which is disposed in a suitable axial recess in the flange 184. Rearward thrust on the stator support 290 is taken by a thrust bearing 292 placed in an axial recess in the flange 184. Forward thrust on the first turbine $T_1$ is taken by the shell 102 through a thrust bearing 294 disposed in an axial recess in the $T_1$ hub 224, which hub takes the thrust of the third turbine $T_3$ through a similar thrust bearing 296 in an axial recess in the hub 228, which latter takes the thrust of the second turbine $T_2$ through a thrust bearing 298 disposed in an axial recess in the hub of the second turbine $T_2$. A thrust bearing 300 is placed between the hub of the second turbine $T_2$ and the stator support 290.

In the planetary gear a system of thrust bearings is provided to take up both forward and rearward thrust. Starting from the front of the gearing any forward thrust on the front ring gear 82 is taken by a thrust bearing 302 which bears against the stationary flange 142. The flange 235 of the second turbine shaft which bears against the thrust bearing 302 takes any forward thrust from the front carrier. This is transmitted to the bearing 304 by the flange 240 on the $T_3$ shaft which in turn takes forward thrust from the sun gear 98 through a bearing 306. The sun gear 98 in turn can absorb the forward thrust from the rear carrier through the bearing 309 on the rear end of the center race 106 and the rear carrier in turn can absorb forward thrust from the rear sun gear 76 through the bearing 310. When the ring gear 96 is locked against reverse rotation during forward drive, forward thrust on the ring gear is transmitted through the ratchet members 118 to the sun gear 98 where it is taken by the bearing 306. During reverse drive the sun gear rotates, but the bearing 306 takes the forward thrust from the ring gear 96, as before explained.

Rearward thrust from the rear carrier 90 is taken by the flange 146 through a thrust bearing 312 and the rear cheek or flange 232 of the carrier takes any rearward thrust of the sun gear 76 through a thrust bearing 314. The sun gear in turn can absorb rearward thrust from the ring gear 96 through the thrust bearing 310 which supports the forward cheek or flange 232 of the carrier 90 against thrust which it in turn receives from the ring gear through a bearing 316 from the race 116. Any rearward thrust on the sun gear 98 is taken by the bearing 309 and transmitted to the bearing 310. Any rearward thrust on the front carrier is taken by the bearing 306 and any rearward thrust on the ring gear 82 is taken by the bearing 304.

FIG. 8 shows a section of the front pump whose driving gear 174 is splined to the clutch input shaft 164 as previously described. This pump may be of any suitable known form, for example it may include an external gear 174 meshing with a larger internal gear 320 from which it is separated by a crescent 322 to provide pumping chambers in the casing 166. This pump always operates when the engine is running to draw oil from a known sump and supply it to the transmission for control and lubrication, as is known.

As shown in FIG. 7D, the crank shafts 120 are journalled in the stator 290 and carry the blades 70 between the support and a shroud 340 which is free of the stator and is welded to the inner shroud 342 of the impeller. The stator support 290 is rotatable about the axis of the transmission but only forward, as is known. The support 290 has an outer wall having a surface 344 jointed to an inner cylindrical wall 346 by a thick annular or radial wall 348 to form an open-ended annular cylinder 350. The support 290 turns on the bearings 291 on the ground sleeve 210 and is prevented from rotating backward by any suitable one-way device including the one-way rollers or sprags 71 which are the ratchet members 71 in FIG. 2.

Each crank 122 is located in an annular groove in an annular piston 352 which slides in the annular cylinder 350 and divides the cylinder into two pressure chambers or expansible chamber motors 354 and 356 for positioning the piston and therefore the stator blades. The chamber 356 is constantly open to the torque converter so that converter pressure always urges the piston toward the right, which is the position of highest blade angle. In this angle the blades make the greatest change of direction of oil flowing from the turbine $T_3$ to the impeller I through the working circuit and thus provide the greatest range of torque multiplication. Pressure in the chamber 354 can stop movement of the piston to the right but can never move the piston to the left because the chamber 354 is supplied with oil under pressure only through a small opening 357 in the piston so that the pressure in the chamber 354 can never exceed the pressure in chamber 356. The blades 70 have a larger area on the downstream side of the shafts 120 than on the upstream side, the downstream side being the right-hand side of the shaft 120, as seen in FIG. 7B. Consequently, the hydraulic force of oil circulating in the torque converter constantly urges the blades to low angle, that is, urges the piston to the left. The apparatus is so proportioned that when there is no pressure in the chamber 354, the pressure maintained in the converter and chamber 356 is sufficient to overcome the hydrodynamic force on the blades 70 and move the blades to their highest angle and this can occur throughout the entire operating range of the torque converter.

The chamber 354 forms with the piston and cylinder an expansible chamber motor for opposing movement of the piston to the right and consequently movement of the blades toward high angle. At some value of pressure in chamber 354 less than the pressure in chamber 356, the force on the piston 352 of the pressure in chamber 356, plus the hydraulic force on the blades 70 equals the force on the piston of pressure in chamber 354 and this holds the blades in one particular position.

Whenever the chamber 354 is vented, the converter pressure in chamber 356 moves the piston to the right and increases the angle of the blades. The chamber 354 may be vented through a tube 360 axially slideable in a bore 362 in the thick radial wall 348, the tube 360 forming a movable inlet for an exhaust conduit 358 connected to the bore 362 as will be explained. When the chamber 354 is vented, the piston moves toward the right until it strikes the end of the tube 360 and this closes the vent.

The transmission includes means for positioning the tube 360 so as to close the vent and hold the stator blades as desired or automatically in accordance with operating conditions. The tube 360 is constantly urged to the left by a spring 364 and may be urged to the right against the force of the spring by pressure in an expansible chamber 366 formed between the tube 360 and the portions of large and small diameters of the bore 362. The pressure existing in the chamber 366 (called the throttle control chamber) determines the position of the tube against the force of the spring and this in turn determines the position of the stator blades as will now be explained.

Suppose that the pressure in chambers 354 and 356 has been equalized, that there is no pressure in throttle control chamber 366. Then the piston is moved against the stop ring 368 by the hydraulic force on the blades 70. The blades are now at lowest angle. The spring 364 presses the tube 360 as far as it will go to the left, that is until the end of the tube is closed by the piston. If it is desired to increase the angle of the stator blades, fluid under pressure is admitted to the chamber 366 through a suitable control conduit. This pressure moves the tube 360 to the right against the spring 364 and each particular value of pressure holds the tube in a particular position. This allows oil to flow from the chamber 354 faster than it can be supplied through the passage 357 in the piston and this vents the chamber 354 or reduces its pressure so that pressure in the chamber 356 moves the piston 352 to the right as fast as the outflow of oil will permit, until the piston again meets the tube 360. This closes the inlet of the exhaust conduit and stops further flow of oil from the chamber 354 and this holds the piston against the tube 360.

Maintaining the piston in any particular position requires maintaining the pressure in chamber 354 at a sufficient value below the pressure in the converter so that the force on the right-hand side of the piston due to the pressure in chamber 354, plus the force on the blades 70 just balances the force of converter pressure on the left of the piston. The force on the blades 70 depends upon the angle of blades, the speed of rotation of the pump, and other factors.

As the vent into tube 360 is closed by the piston, oil flowing into chamber 354 through opening 357 begins to increase the pressure in chamber 354 toward the value of converter pressure. When the sum of the force of the pressure in chamber 354 on piston 352 and the hydrodynamic force on the blades exceeds the force of pressure in chamber 356 on the piston, the piston will move away from the tube 360 which remains held by the spring 364 and pressure in throttle control chamber 366. This slightly opens the vent which then again reduces the pressure in chamber 354 and permits the converter pressure to return the piston to its position against the tube. The piston thus hunts or hovers in a narrow range of movement between complete closing and slight opening of the vent tube 360 and this holds the stator blades 70 in a position determined by the position of the tube which, as previously explained, is determined by the pressure in chamber 366. In order to increase the angle of the blades 70 and thereby increase the performance or range of torque multiplication of the torque converter, I merely increase pressure in chamber 366 in any suitable manner and conversely to decrease the stator blade angles I reduce the pressure. This can be done either manually at the will of the driver of the car or automatically in accordance with driving conditions, for example by means of the control system illustrated in my divisional application Serial Number 838,736.

Figure 3:
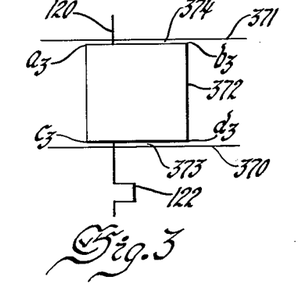
FIG. 3 is a schematic section taken like FIG. 2 showing one form of reaction member in one position of adjustment.

One of the objects of the invention is to increase the effectiveness of the stator in increasing the torque ratio and to avoid decreasing the rate of increase or torque ratio as the angle of the blades is increased. This is accomplished by the arrangement of flow surfaces so that a substantially constant spacing is maintained between the ends of the stator blades 70 and the surfaces which direct or confine the oil flow between the third turbine $T_3$ and the impeller I. This is diagrammatically illustrated in FIGS. 3 to 5A. It is customary to provide an inner substantially cylindrical wall 370 and an outer substantially cylindrical wall 371 which together form an annular passage for the oil flowing from the turbine to the impeller. These walls correspond functionally to the surfaces 344 and 340 respectively in FIG. 7B. FIG. 3 is an enlarged section taken as FIG. 2 is taken showing diagrammatically the relationship between the walls 370 and 371 and a projection 372 on an axial plane of a stator blade 70. In this view the traces of the surfaces 370 and 371 are straight lines. If the top edge $a3$—$b3$ of the projection of the stator blade 70 and the bottom edge $c3$—$d3$ are straight parallel lines, then when the principal plane of the stator blade is parallel to the axis of the transmission there will be a clearance 373 between the inner or bottom edge of the stator blade and the wall 370 and a clearance 374 between the top edge of the stator blade and the wall 371. These clearances will be substantially constant through the length of the stator blade.

Figure 4:
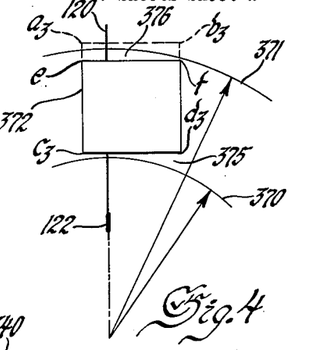
FIG. 4 is a fragment of a section on the line 4—4 of FIG. 2 showing a transverse view of the same form of reaction member as in FIG. 3 but in another position of adjustment.

FIG. 4 is a section on the line 4—4 of FIG. 2 showing the traces of the walls 370 and 371 as circles. From this it is apparent that the blade shown in FIG. 3 will be too wide radially to be turned parallel to the trace of the transverse plane through the section line 4—4 because the corner $b3$ would strike the wall 371. Consequently, in order to permit turning the blade, the blade must be made shorter than in FIG. 3 as represented by a square $c3$, $d3$, $f$, $e$. Where the blade is so shortened, it not only has a smaller effective area, but there is a large gap or clearance 375 between the corner $d3$ and the wall 370 and there is also a gap 376 between the wall 371 and the center of the upper edge $ef$ of the blade. These clearances further reduce the effectiveness of the stator in changing the direction of oil and thus reduce the effectiveness of the torque converter in multiplying torque.

Figure 5:
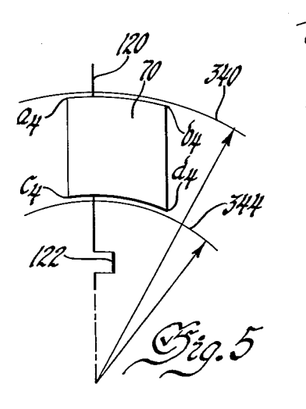
FIGS. 5 and 5A are sections corresponding to FIGS. 3 and 4, respectively, showing a different form of reaction member in positions of adjustment corresponding to FIGS. 3 and 4.
Figure 5A:
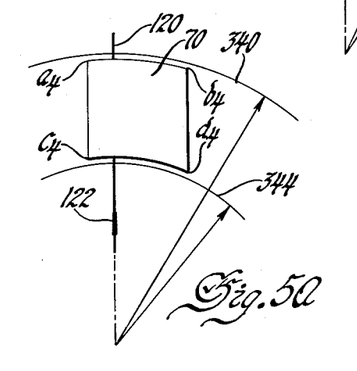
Figure 6:
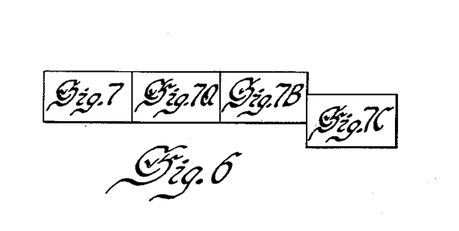
FIG. 6 is a map showing the relative arrangement of the sheets of drawing which include FIGS. 7, 7A, 7B and 7C to constitute one-half of a structural section corresponding to FIG. 2,
FIGS. 7, 7A, 7B and 7C collectively form the upper half of a symmetrical, longitudinal section of an actual structure of a transmission and differential assembly embodying one form of the invention.

In this transmission the above described disadvantages are avoided by constructing the stator blades and the surfaces 344 and 340 corresponding to 370 and 371, respectively, as shown diagrammatically in FIGS. 5 and 5A and structurally in FIG. 7B. The surfaces 344 and 340 are formed as portions of the surfaces of concentric spheres whose center it at the intersection of the axes of the spindles 120 and the axis of shaft 48. Consequently, when a section is taken either transversely to the axis as in FIG. 5A or through the axis as in FIG. 5, or at any position in between, the traces of the walls 344 and 340 will be concentric circles whose center is on the axis of rotation of the spindle 120. The upper edge $a4$, $b4$ and the lower edge $c4$, $d4$ of the stator blade are also concentric circles whose center is on the axis of the spindle 120 and whose radii differ from the radii of the spheres forming the walls 344 and 340 to provide sufficient clearances to permit movement of the stator blade. This clearance can be small enough so that the blade practically forms a seal with the walls 344 and 340 in all positions of the stator blade. This materially increases the effectiveness of the stator blade both by permitting the larger effective area in a given size of torque converter and keeping the clearances small and constant. This increases the torque multiplying range of any converter having a given diameter.

The transmission drives any suitable form of differential gearing which permits close spacing of the axis of the differential input shaft 56 and the axis of the drive axles 34.

I claim:

1. A speed-reducing transmission and final drive assembly comprising in combination, a differential housing, a differential in the housing adapted to drive a pair of axles, a differential input shaft in the housing, a torque converter housing secured to the differential housing adjacent the shaft, a hydrodynamic torque converter in the torque converter housing having a power input member and a power output member, a gear housing secured to that side of the torque converter housing which is opposite the differential housing, forward and reverse speed reducing gearing in the gear housing having a power input and a power output, the power input of the gearing being drivingly connected to the output of the torque converter and the power output of the gearing being drivingly connected to the differential input shaft and a power input shaft extending through the gear housing and drivingly connected to the torque converter input member.

2. A speed-reducing transmission and final drive assembly comprising in combination, a differential housing, a differential in the housing adapted to drive a pair of axles, a differential input shaft in the housing, a torque converter housing secured to the differential housing adjacent the shaft, a hydrodynamic torque converter in the torque converter housing having a power input member and a power output member, a gear housing secured to that side of the torque converter housing which is opposite the differential housing, a planetary forward and reverse speed-reducing gearset in the gear housing having a power input and a power output, the power input of the gearing being drivingly connected to the output of the torque converter and the power output of the gearing being drivingly connected to the differential input shaft and a power input shaft extending through the gearset and drivingly connected to the torque converter input member.

3. A speed-reducing transmission and final drive assembly comprising in combination, a differential housing, a differential in the housing adapted to drive a pair of axles, a differential input shaft in the housing, a torque converter housing secured to the differential housing adjacent the shaft, a hydrodynamic torque converter in the torque converter housing having a power input member and a power output member, a gear housing secured to that side of the torque converter housing which is opposite the differential housing, forward and reverse speed-reducing gearing in the gear housing having a power input and a power output, a casing surrounding the torque converter and drivingly connected to the differential input shaft, the power input of the gearing being drivingly connected to the output of the torque converter and the power output of the gearing being drivingly connected to said casing and a power input shaft extending through the gear housing and drivingly connected to the torque converter input member.

4. A speed-reducing transmission and final drive assembly comprising in combination, a differential housing, a differential in the housing adapted to drive a pair of axles, a differential input shaft in the housing disposed transverse to the line of the axles, a torque converter housing secured to the differential housing, a hydrodynamic torque converter in the torque converter housing and axially aligned with the differential input shaft and having a power input member and a power output member, a gear housing secured to that side of the torque converter housing which is opposite the differential housing, a forward and reverse planetary gearset in the gear housing axially aligned with the torque converter and with the differential input shaft and having a power input member and a power output member, a casing surrounding the torque converter and drivingly connected to the differential input shaft, the power input member of the gearset being drivingly connected to the output member of the torque converter and the power output of the gearset being drivingly connected to said casing, and a power input shaft extending through the gearset and aligned with the differential input shaft and drivingly connected to the torque converter input member.

5. A speed-reducing transmission and final drive assembly comprising in combination, a differential housing, a differential in the housing adapted to drive a pair of axles, a differential input shaft in the housing disposed transverse to the line of the axles, a torque converter housing secured to the differential housing, a hydrodynamic torque converter in the torque converter housing and axially aligned with the differential input shaft and having a power input member and a plurality of power output members, a gear housing secured to that side of the torque converter housing which is opposite the differential housing, forward and reverse planetary gearing in the gear housing axially aligned with the torque converter and with the differential input shaft and having a power input member and a power output member, a casing surrounding the torque converter and drivingly connected to the differential input shaft and to one of the torque converter output members, the power input member of the gearing being drivingly connected to another output member of the torque converter and the power output of the gearing being drivingly connected to said casing, and a power input shaft extending through the gearset and aligned with the differential input shaft and drivingly connected to the torque converter input member.

6. A speed-reducing transmission and final drive assembly comprising in combination, a differential housing, a differential in the housing adapted to drive a pair of axles, a differential input shaft in the housing disposed transverse to the line of the axles, a torque converter housing secured to the differential housing, a hydrodynamic torque converter in the torque converter housing and axially aligned with the differential input shaft and having a power input member and a plurality of power output members, a gear housing secured to that side of the torque converter housing which is opposite the differential housing, forward and reverse planetary gearing in the gear housing axially aligned with the torque converter and with the differential input shaft and having a plurality of power input members and a power output member, a casing surrounding the torque converter and drivingly connected to the differential input shaft and to one of the torque converter output members, the power input members of the gearing being drivingly connected respectively to the other output members of the torque converter and the power output of the gearing being drivingly connected to said casing and a power input shaft extending through the gearset and aligned with the differential input shaft and drivingly connected to the torque converter input member.

7. A speed reducing transmission and final drive assembly comprising in combination a differential housing, a differential in the housing adapted to drive a pair of axles, a differential input shaft in the housing, a torque converter housing secured to the differential housing adjacent the shaft, a hydrodynamic torque converter in the torque converter housing having a power input member and a power output member, a gear housing secured to that side of the torque converter housing which is opposite the differential housing, a planetary forward and reverse speed reducing gear set in the gear housing having a power input and a power output, the power input of the gearing being drivingly connected to the output of the torque converter and the power output of the gearing being drivingly connected to the differential input shaft, a power input shaft extending through the gear set and drivingly connected to the torque converter input member, a clutch housing secured to that side of the gear housing which is opposite the torque converter housing, and a clutch in the housing adapted to connect the last named power input shaft to a prime mover.

8. A speed-reducing transmission and final drive assembly comprising in combination a differential housing, a differential in the housing adapted to drive a pair of axles, a differential input shaft in the housing, a torque converter housing secured to the differential housing adjacent the shaft, a hydrodynamic torque converter in the torque converter housing having a power input member and a power output member, a gear housing secured to that side of the torque converter housing which is opposite the differential housing, the mean diameter of the gear housing being less than the mean diameter of the torque converter housing, a planetary forward and reverse speed-reducing gear set in the gear housing having a power input member and a power output member, the power input of the gearing being drivingly connected to the output of the torque converter and the power output of the gearing being drivingly connected to the differential input shaft, a power input shaft extending through the gear set and drivingly connected to the torque converter input member, a clutch housing secured to that side of the gear housing which is opposite the torque converter housing, the mean diameter of the clutch housing being less than the mean diameter of the gear housing and a clutch in the clutch housing adapted to connect the last-named power input shaft to a prime mover.

9. A speed-reducing transmission and final drive assembly comprising in combination a differential housing, a differential in the housing adapted to drive a pair of axles, a differential input shaft in the housing, a torque converter housing secured to the differential housing adjacent the shaft, a hydrodynamic torque converter in the torque converter housing having a power input member and a power output member, a gear housing secured to that side of the torque converter housing which is opposite the differential housing, the mean diameter of the gear housing being less than the mean diameter of the torque converter housing, a planetary forward and reverse speed-reducing gear set in the gear housing having a power input member and a power output member, the power input of the gearing being drivingly connected to the output of the torque converter and the power output of the gearing being drivingly connected to the differential input shaft, a pair of torque-establishing devices in the gear housing surrounding the gear set and adapted selectively to establish forward and reverse drive, a pair of fluid pressure operators for the torque-establishing devices in the gear housing surrounding the gear set, a power input shaft extending through the gear set and drivingly connected to the torque converter input member, a clutch housing secured to that side of the gear housing which is opposite the torque converter housing, the mean diameter of the clutch housing being less than the mean diameter of the gear housing and a clutch in the clutch housing adapted to connect the last-named power input shaft to a prime mover.

10. A speed-reducing transmission and final drive assembly comprising in combination a differential housing, a differential in the housing adapted to drive a pair of axles, a differential input shaft in the housing, a generally conical torque converter housing secured to the differential housing adjacent the shaft, a hydrodynamic torque converter in the torque converter housing having a power input member and a power output member, a generally conical gear housing secured to that side of the torque converter housing which is opposite the differential housing, the mean diameter of the gear housing being less than the mean diameter of the torque converter housing, a planetary forward and reverse speed-reducing gear set in the gear housing having a power input member and a power output member, the power input of the gearing being drivingly connected to the output of the torque converter and the power output of the gearing being drivingly connected to the differential input shaft, a pair of torque-establishing devices in the gear housing surrounding the gear set and adapted selectively to establish forward and reverse drive, a pair of fluid pressure operators for the torque-establishing devices in the gear housing surrounding the gear set, a power input shaft extending through the gear set and drivingly connected to the torque converter input member, a clutch housing secured to that side of the gear housing which is opposite the torque converter housing, the mean diameter of the clutch housing being less than the mean diameter of the gear housing, a clutch in the clutch housing adapted to connect the last-named power input shaft to a prime mover, a valve housing secured to the assembly adjacent the generally conical side of the gear housing, and valve mechanism in the valve housing for controlling the fluid pressure operators.

11. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including an input gear, a reaction gear, and planet gears journalled on a carrier and meshing with the input and reaction gears, the first turbine receiving liquid from the impeller being connected to drive the input gear of one gear set through a tube surrounding the input shaft, the second turbine receiving liquid from the first turbine being connected to drive the input gear of the other gear set through a second tube surrounding the shaft; the third turbine receiving liquid from the second turbine being connected to drive both carriers through a third tube surrounding the shaft; means for preventing reverse rotation while permitting forward rotation of both reaction gears and a power output member and driven by the carriers.

12. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including an input gear, a reaction gear, and planet gears journalled on a carrier and meshing with the input and reaction gears, the first turbine receiving liquid from the impeller being connected to drive the input gear of one gear set through a tube surrounding the input shaft; the second turbine receiving liquid from the first turbine being connected to drive the input gear of the other gear set through a second tube surrounding the shaft; the third turbine receiving liquid from the second turbine being connected to drive both carriers through a third tube surrounding the shaft; means for preventing reverse rotation while permitting forward rotation of both reaction gears and a power output member in alignment with the input shaft and driven by the carriers.

13. A transmission comprising in combination a power input shaft adapted to be connected at one end to a prime mover and connected at its other end to the impeller of a torque transmitter which surrounds the shaft; the torque transmitter including a pluraliy of turbines surrounding the shaft for receiving liquid circulated by the impeller; first and second planetary gear sets surrounding the shaft between the first-mentioned end of the shaft and the torque transmitter, each gear set including an input gear, a reaction gear, and planet gears journalled on a carrier and meshing with the injut and reaction gears, the first turbine receiving liquid from the impeller being connected to drive the input gear of one gear set through a tube surrounding the input shaft; the second turbine receiving liquid from the first turbine being connected to drive the input gear of the other gear set through a second tube surrounding the shaft; the third turbine receiving liquid from the second turbine being connected to drive both carriers through a third tube surrounding the shaft; means for preventing reverse rotation while permitting forward rotation of both reaction gears and a power output shaft in alignment with the input shaft and disposed on the opposite side of the transmitter from the gear sets and driven by the carriers.

14. A transmission comprising in combination a power input shaft adapted to be connected at one end to a prime mover and connected at is other end to the impeller of a torque transmitter which surrounds, the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including an input gear, a reaction gear, and planet gears journalled on a carrier and meshing with the input and reaction gears, the first turbine receiving liquid from the impeller being connected to drive the input gear of one gear set through a tube surrounding the input shaft; the second turbine receiving liquid from the first turbine being connected to drive the input gear of the other gear set through a second tube surrounding the shaft; the third turbine receiving liquid from the second turbine being connected to drive both carriers through a third tube surrounding the shaft; means for preventing reverse rotation while permitting forward rotation of both reaction gears, a power output shaft in alignment with the input shaft and disposed on the opposite side of the transmitter from the gear sets and a casing surrounding the transmitter and drivingly connected to the carriers and to said output shaft.

15. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including a sun gear, a ring gear and planet gears journalled on a carrier and meshing with the sun and ring gears, the first turbine receiving liquid from the impeller being connected to drive the sun gear of the first gear set through a tube surrounding the input shaft; the second turbine receiving liquid from the first turbine being connected to drive the ring gear of the second gear set through a second tube surrounding the shaft; the third turbine receiving liquid from the second turbine being connected to drive both carriers through a third tube surrounding the shaft; means for preventing reverse rotation while permitting forward rotation of the sun gear of the second gear set and the ring gear of the first gear set and a power output member and driven by the carriers.

16. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including a sun gear, a ring gear and planet gears journalled on a carrier and meshing with the sun and ring gears, the first turbine receiving liquid from the impeller being connected to drive the sung gear of the first gear set through a tube surrounding the input shaft; the second turbine receiving liquid from the first turbine being connected to drive the ring gear of the second gear set through a second tube surrounding the shaft; the third turbine receiving liquid from the second turbine being connected to drive both carriers through a third tube surrounding the shaft; means for preventing reverse rotation while permitting forward rotation of the sun gear of the second gear set and the ring gear of the first gear set and a power output member and driven by the carriers, said last-mentioned means being constructed and arranged to permit forward rotation of the ring gear of the first gear set while preventing reverse rotation of the sun gear of the second gear set.

17. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including a sun gear, a ring gear and planet gears journalled on a carrier and meshing with the sun and ring gears, the first turbine receiving liquid from the impeller being connected to drive the sun gear of the first gear set through a tube surrounding the input shaft, the second turbine receiving liquid from the first turbine being connected to drive the ring gear of the second gear set through a second tube surrounding the shaft; the third turbine receiving liquid from the second turbine being connected to drive both carriers through a third tube surrounding the shaft; a first one-way clutch located between the gear sets, means for conditioning the clutch to prevent reverse rotation while permitting forward rotation of the sun gear of the second gear set, a second one-way clutch located between the first one-way clutch and the first gear set, the second one-way clutch being constructed and arranged to permit forward rotation of the ring gear of the first gear set and arranged to prevent reverse rotation of the first ring gear whenever the first one-way clutch prevents reverse rotation of the second sun gear.

18. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including a sun gear, a ring gear and planet gears journalled on a carrier and meshing with the run and ring gears, the first turbine receiving liquid from the impeller being connected to drive the sun gear of the first gear set through a tube surrounding the input shaft, the second turbine receiving liquid from the first turbine being connected to drive the ring gear of the second gear set through a second tube surrounding the shaft; the third turbine receiving liquid from the second turbine being connected to drive both carriers through a third tube surrounding the shaft; a one-way clutch having one member thereof connected to the second sun gear, a second member thereof being adapted selectively to be held fixed or released for rotation, and one-way motion transmitting means between said clutch members; a third clutch member fixed to the first ring gear, one-way motion transmitting means between said third and said second members; means for holding the second member fixed to cause forward rotation of the carriers in response to forward rotation of the first turbine; and means for holding the second ring gear fixed while releasing said second member to cause reverse rotation of the carriers in response to forward rotation of the first turbine.

19. A transmission comprising in combination a power input shaft adapted to be connected at one end to a prime mover and connected at its other end to the impeller of a torque transmitter which surrounds the shaft; the torque transmitter including a plurality of turbines surrounding the shaft for receiving liquid circulated by the impeller; first and second planetary gear sets surrounding the shaft between the first-mentioned end of the shaft and the torque transmitter, each gear set including a sun gear, a ring gear and planet gears journalled on a carrier and meshing with the sun and ring gears, the first turbine receiving liquid from the impeller being connected to drive the sun gear of the first gear set through a tube surrounding the input shaft; the second turbine receiving liquid from the first turbine being connected to drive the ring gear of the second gear set through a second tube surrounding the shaft; the third turbine receiving liquid from the second turbine being connected to drive both carriers through a third tube surrounding the shaft; a sleeve forming an inner race for a one-way clutch coaxial with and connected to the second sun gear, a first outer race surrounding the inner race, means for selectively holding fixed or releasing for rotation said first outer race, first ratchet means between said races, said ratchet means being arranged to prevent rotation in one sense of the inner race when the outer race is held, a second outer race surrounding the inner race and located axially beside the first outer race, the second outer race being connected to the first ring gear, second ratchet means between the inner race and second outer race, said second ratchet means being arranged to prevent rotation of the second outer race in the same sense when the first outer race is held.

20. A transmission comprising in combination a power input shaft adapted to be connected at one end to a prime mover and connected at its other end to the impeller of a hydrodynamic torque transmitter which surrounds the shaft; the torque transmitter including a plurality of turbines surrounding the shaft and adapted to receive liquid circulated by the impeller; first and second planetary gear sets surrounding the shaft between the first mentioned end of the shaft and the torque transmitter, each gear set including a sun gear, a ring gear and planet gears journalled on a carrier and meshing with the sun and ring gears; a first tube surrounding the input shaft and drivingly connecting the sun gear of the first gear set to the first turbine receiving liquid from the impeller; a second tube within the first tube and drivingly connecting the second turbine receiving liquid from the impeller to the ring gear of the second gear set; a third tube between the first and second tube and drivingly connecting the third turbine receiving liquid from the impeller to both carriers; and a power output member connected to the first carrier and disposed between the first gear set and the transmitter.

21. A transmission comprising in combination a power input shaft adapted to be connected at one end to a prime mover and connected at its other end to the impeller of a hydrodynamic torque transmitter which surrounds the shaft; the torque transmitter including a plurality of turbines surrounding the shaft and adapted to receive liquid circulated by the impeller; first and second planetary gear sets surrounding the shaft between the first-mentioned end of the shaft and the torque transmitter, each gear set including a sun gear, a ring gear and planet gears journalled on a carrier and meshing with the sun and ring gears; a first tube surrounding the input shaft and drivingly connecting the sun gear of the first gear set to the first turbine receiving liquid from the impeller; a second tube within the first tube and drivingly connecting the second turbine receiving liquid from the impeller to the ring gear of the second gear set; a third tube between the first and second tube and drivingly connecting the third turbine receiving liquid from the impeller to both carriers; a power output member connected to the first carrier and disposed between the first gear set and the transmitter; an output shaft in alignment with the input shaft and on the opposite side of the transmitter from the gear set; and a casing surrounding the transmitter and connecting said output member and the output shaft.

22. A transmission comprising in combination a stationary casing; a power input shaft within the casing adapted to be connected at one end to a prime mover and connected at its other end to the impeller of a hydrodynamic torque transmitter which surrounds the shaft; the torque transmitter including a plurality of turbines and a reaction member surrounding the shaft and adapted to receive liquid circulated by the impeller; first and second planetary gear sets surrounding the shaft between the first mentioned end of the shaft and the torque transmitter, each gear set including a sun gear, a ring gear and planet gears journalled on a carrier and meshing with the sun and ring gears; a first tube surrounding the input shaft and drivingly connecting the sun gear of the first gear set to the first turbine receiving liquid from the impeller; a second tube within the first tube and drivingly connecting the second turbine receiving liquid from the impeller to the ring gear of the second gear set; a third tube between the first and second tube and drivingly connecting the third turbine receiving liquid from the impeller to both carriers; a fourth tube within the other tubes fixed at one end to the casing and extending into the transmitter; means on the tube and on the reaction member for preventing reverse rotation and permitting forward rotation of the reaction member; and a power output member connected to the first carrier and disposed between the first gear set and the transmitter.

References Cited in the file of this patent
UNITED STATES PATENTS

| | | |
|---|---|---|
| 1,242,974 | Pinckney | Oct. 16, 1917 |
| 1,921,554 | Wellman et al. | Aug. 8, 1933 |
| 2,457,907 | Malmsten | Jan. 4, 1949 |
| 2,613,503 | Syrovy | Oct. 14, 1952 |
| 2,613,775 | Dunn | Oct. 14, 1952 |
| 2,627,723 | Seybold | Feb. 10, 1953 |
| 2,645,137 | Roche | July 14, 1953 |
| 2,719,617 | Stoltz | Oct. 4, 1955 |
| 2,750,018 | Dundore | June 12, 1956 |
| 2,768,537 | Seybold | Oct. 30, 1956 |
| 2,787,170 | Forster | Apr. 2, 1957 |
| 2,791,912 | Bixby | May 14, 1957 |
| 2,793,726 | Jandasek | May 28, 1957 |
| 2,820,373 | Dodge | Jan. 21, 1958 |
| 2,855,803 | Knowles | Oct. 14, 1958 |
| 2,932,220 | Nash | Apr. 12, 1960 |